Jan. 8, 1963
T. F. DUARTE
3,072,158
AUTOMATIC WOOD TRIMMING SAW MACHINE
Filed Oct. 11, 1960
4 Sheets-Sheet 1
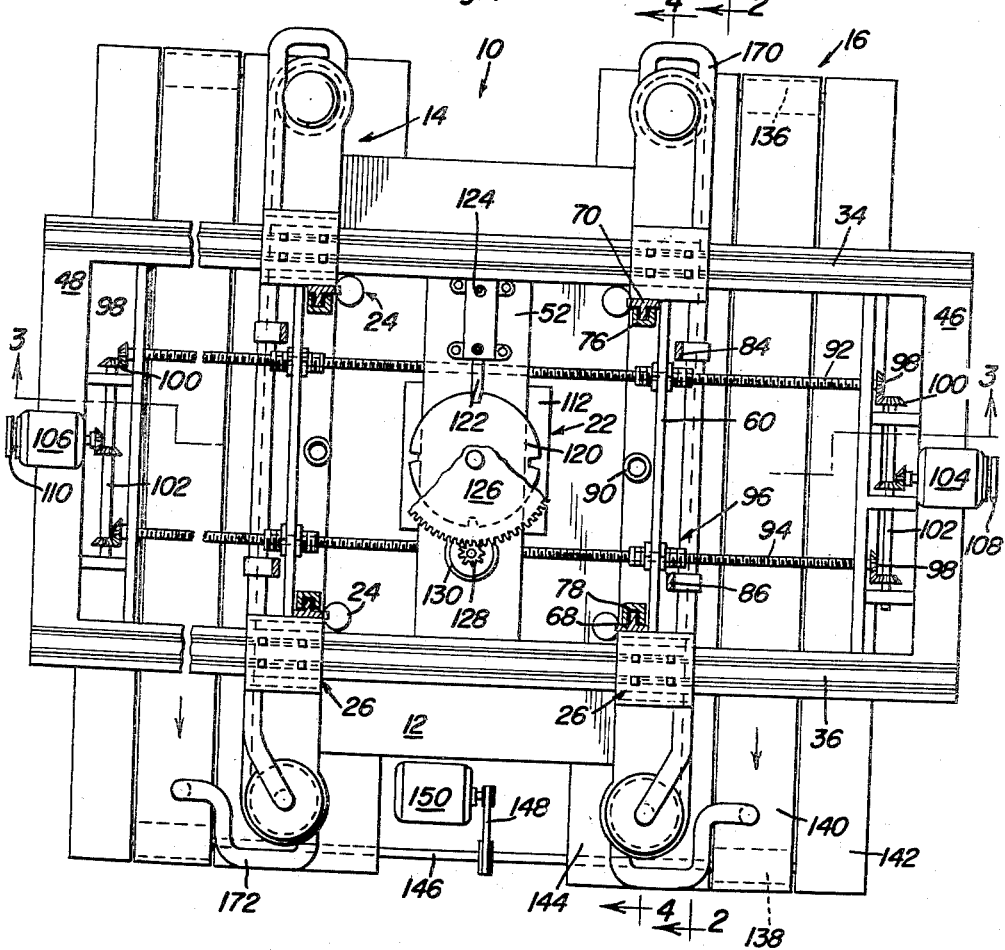
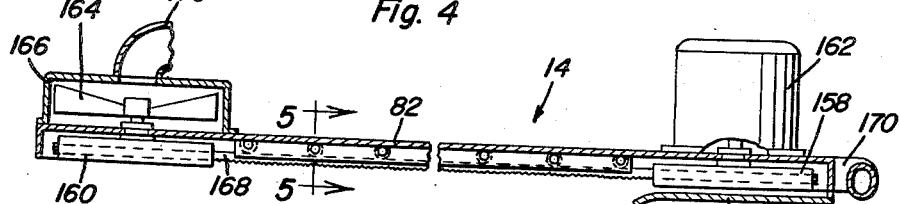
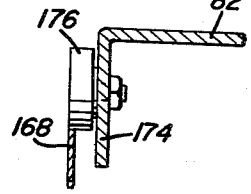
Tom F. Duarte
INVENTOR.

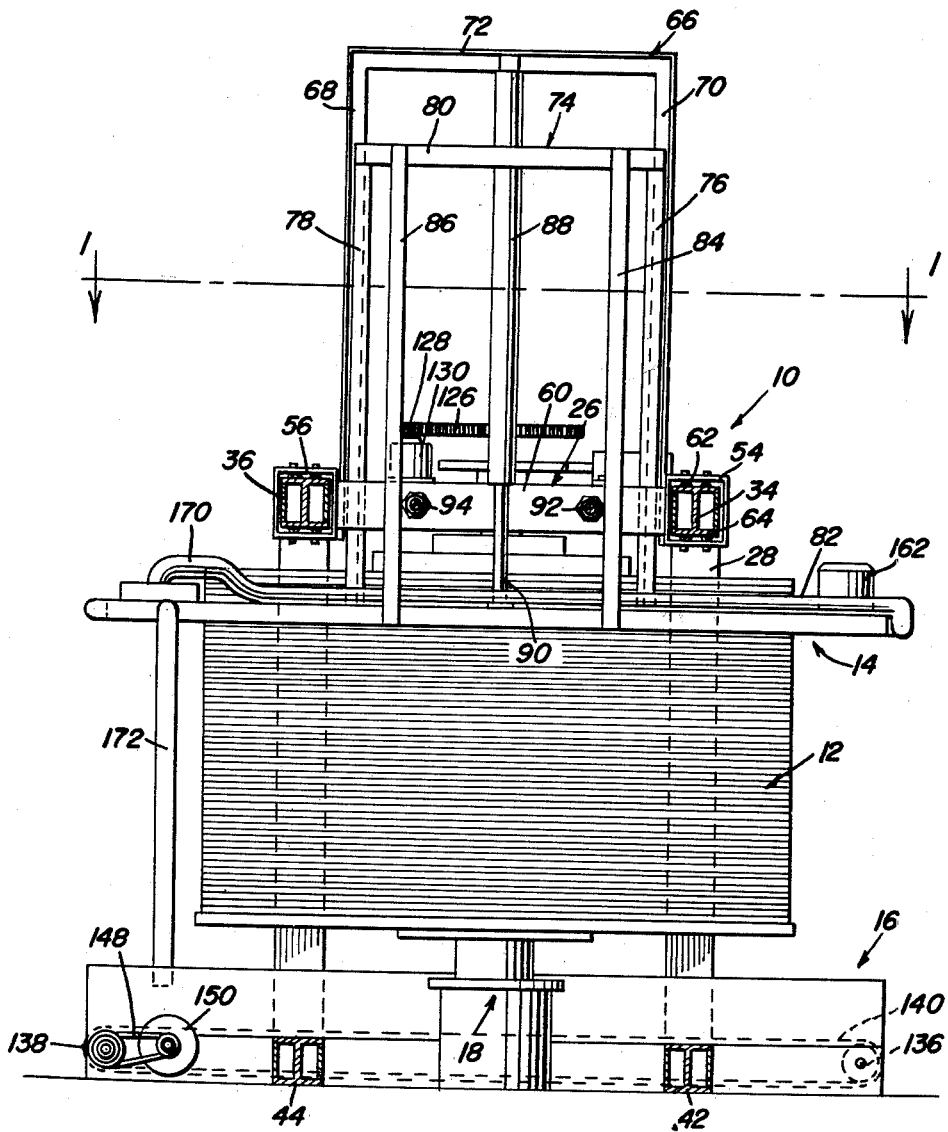

Jan. 8, 1963

T. F. DUARTE 3,072,158

AUTOMATIC WOOD TRIMMING SAW MACHINE

Filed Oct. 11, 1960

Tom F. Duarte
INVENTOR.

Jan. 8, 1963 T. F. DUARTE 3,072,158
AUTOMATIC WOOD TRIMMING SAW MACHINE
Filed Oct. 11, 1960 4 Sheets-Sheet 4
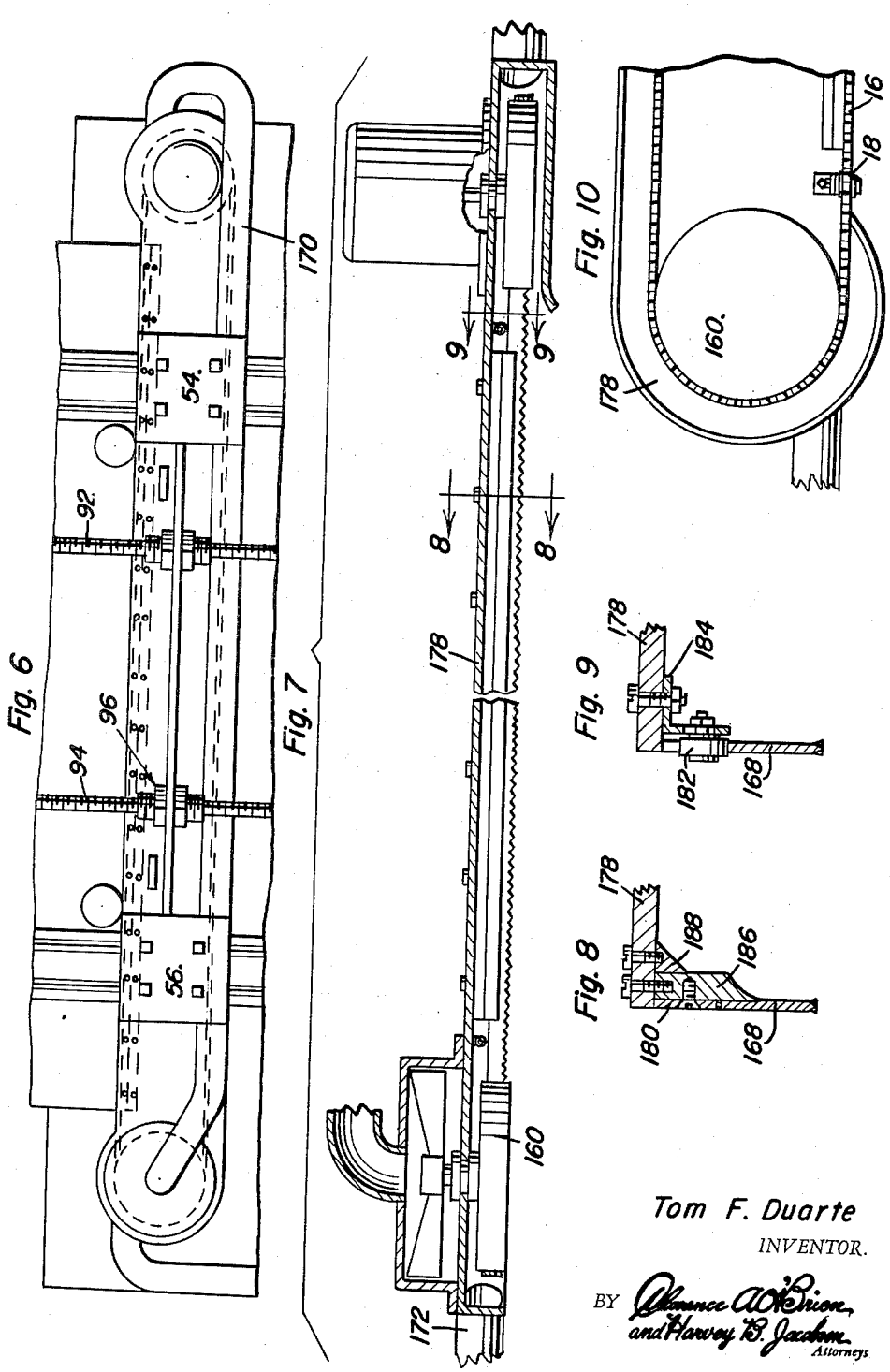
Tom F. Duarte
INVENTOR.

United States Patent Office 3,072,158
Patented Jan. 8, 1963

3,072,158
AUTOMATIC WOOD TRIMMING SAW MACHINE
Tom F. Duarte, P.O. Box 716, Sonoma, Calif.
Filed Oct. 11, 1960, Ser. No. 61,923
13 Claims. (Cl. 143—19)

This invention relates to a machine which may be conditioned for automatic operation so as to trim and square a stack of panel boards such as plywood.

It is therefore a primary object of this invention to provide a machine which may be automatically operated for the purpose of squaring and trimming fabricated plywood, chip board, composition board panels, etc. to thereby reduce labor costs for sawing the panel boards to size and also considerable savings in time and reduction in waste from the sawing operations.

A further object of this invention in accordance with the foregoing object, is to provide a sawing machine capable of being automatically operated to square and trim a stack of panel boards, which machine may be adjusted and controlled for varying dimensional requirements desired.

An additional object of this invention is to provide an automatically operable saw machine which by virtue of its adjustability features will trim and square panel boards with great accuracy and with a minimum of trimming necessary with the trimmings being automatically collected and delivered by the machine to a delivery point for use or disposal as desired.

A still further object of this invention is to provide a saw machine which is so designed as to enable it to be automatically adjusted and controlled from a remote point, said machine accordingly operating in a sequential manner to square and trim a load of stacked panel boards placed thereon. The saw machine is therefore especially useful in conjunction with automatically operable handling and conveying mechanism by means of which fabricated panel boards may be sized, graded, stamped, branded and otherwise handled in addition to the squaring and trimming accomplished by the saw machine made in accordance with this invention.

The saw machine therefore includes a frame assembly which at the bottom thereof mounts a table hoist mechanism upon which a stack of uncut panel boards may be automatically placed. The machine frame also mounts adjacent to the table hoist mechanism refuse collecting and delivering mechanism by means of which the trimmings cut from the panel boards will be directed on to conveyor belts for delivery thereof to a desired end of the machine frame. When the saw machine is set into operation therefore, the table hoist mechanism will raise the load of stacked panel boards up into engagement with the top platen member which is rotatably mounted by the machine frame in vertically spaced relation above the table hoist mechanism. When the top platen has a predetermined pressure exerted thereon by the top panel board, hydraulically operated panel hold-down mechanisms will be brought into contact with the top panel edges and when said hold-down mechanisms engage the panel edges with a predetermined pressure they set into operation by means of a pressure signal a pair of band saw assemblies. The band saw assemblies are accordingly mounted on a subframe assembly which is adjustably mounted on the machine frame in order to move the saw assemblies toward or away from each other for the purpose of cutting the panel boards to a predetermined size. The subframe assembly therefore also slidably mounts power operated ram mechanisms which sequentially move the saw assemblies downwardly as the band blades thereof are being driven by electric motors mounted by each saw assembly in order to cut through the stack of panel boards. Accordingly, the power rams move the saw assemblies down to the table hoist mechanism after the elevating movement of the hoist table has stopped in response to a predetermined pressure on the platen. Energization of the saw assemblies and powered movement thereof downwardly will cease when they have cut through the stack of panel boards after reaching the table hoist mechanism level. The power operated rams will subsequently therefore raise the saw assemblies to their starting position. After the stack of panel boards have been cut as herein above indicated, the saw assemblies upon returning to their starting position will actuate by means of limit switches, for example, control mechanism for power rotation of the top platen member 90° to thereby rotate the stack of panel boards so that they may be subsequently cut once again by the power operated and movable saw assemblies. Accordingly, the other sides of the stack of panel boards are trimmed in order to square the panel boards. After all the sides have been cut as hereinbefore indicated, the table hoist mechanism is lowered so that the finished panel boards may be removed therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan and sectional view of the saw machine taken through a plane indicated by section line 1—1 in FIGURE 2.

FIGURE 2 is a sectional view taken through a plane indicated by section line 2—2 of FIGURE 1.

FIGURE 4 (Sheet 1) is a sectional view through a band saw assembly taken substantially through a plane indicated by section line 4—4 in FIGURE 1.

FIGURE 5 is a sectional view taken through a plane indicated by section line 5—5 in FIGURE 4.

FIGURE 6 (Sheet 4) is an enlarged top plan view of the band saw assembly.

FIGURE 7 is a sectional view of the band saw assembly similar to FIGURE 4 but illustrating a modification thereof.

FIGURE 8 is a partial sectional view through a plane indicated by section line 8—8 in FIGURE 7.

FIGURE 9 is a partial sectional view through a plane indicated by section line 9—9 in FIGURE 7.

FIGURE 10 is a partial bottom view of the band saw assembly at the blower end thereof.

Figures 3, 11:
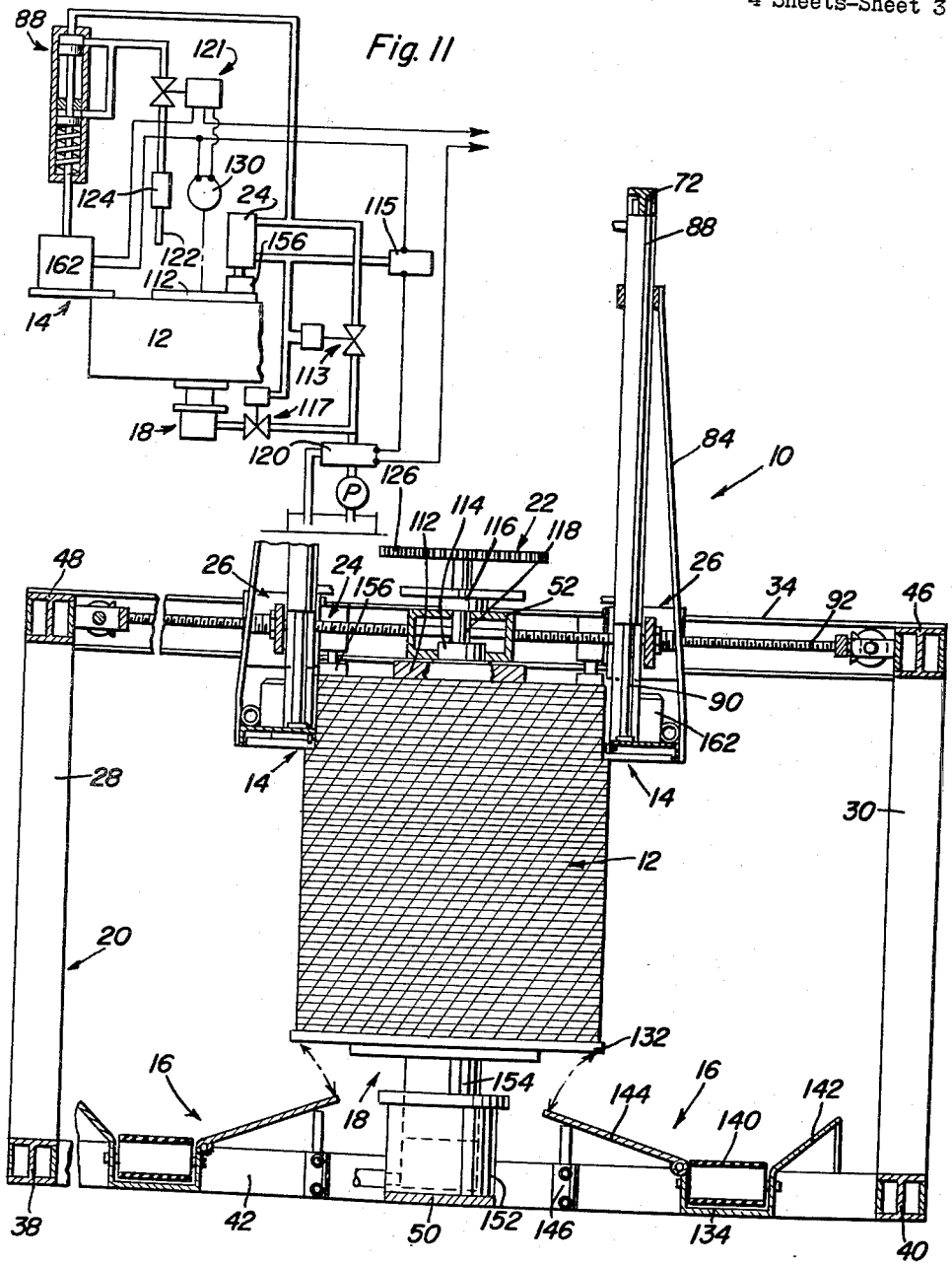
FIGURE 3 is a sectional view taken through a plane indicated by section line 3—3 in FIGURE 1.
FIGURE 11 is a simplified diagrammatic illustration of an exemplary control system that may be utilized in connection with the invention.

Referring now to the drawings in detail, the saw machine is generally designated by reference numeral 10. Referring therefore to FIGURE 3 in particular, it will be observed that a stack of panel boards such as plywood boards 12 are illustrated as positioned on the machine 10 and being cut by the band saw assemblies thereof generally designated by reference numeral 14.

Each of the band saw assemblies 14 are, of course, identical in construction and are mirror images of each other in operative relation to the machine 10 and the stack of panel boards 12 cut thereby. It will accordingly be observed that the band saw assemblies 14 are being moved downwardly in FIGURE 3 trimming off a small portion of two opposite parallel sides of the stack of panel boards 12 as the assemblies 14 move downwardly. It will therefore be noted that in position below the band saw assemblies 14 on either side of the panel boards stack 12 are a pair of refuse collecting and conveying mechanisms 16 which are also identical in construction. It will also be observed that the panel boards stack 12 is supported on a hydraulically operated table hoist mechanism generally designated by reference numeral 18. The hoist mechanism 18 and refuse collecting and conveying mechanisms 16 are mounted on the base portion of a frame assembly 20. It will also be observed that the top portion of the frame assembly 20 mounts a turning platen mechanism generally indicated by reference numeral 22 and a plurality of panel edge hold-down mechanisms 24. Accordingly, the hoist mechanism 18 will elevate the stacked load 12 into engagement with the platen mechanism and hold-down mechanisms 24 prior to cutting of the sides of the load by the band saw assemblies 14. It will therefore be observed that the frame assembly 20 also slidably mounts a pair of sub-frame assemblies 26 from which the band saw assemblies 14 are suspended, said subframe assemblies 26 therefore also being similar in construction to each other and being adjustably positioned on the general frame assembly 20 toward and away from each other by adjustment mechanism provided for the purpose as more clearly seen in FIGURE 1 so as to vary the size of the panel boards cut by the band saw assemblies 14.

Referring to FIGURES 1, 2 and 3 in particular it, will be observed that the machine frame assembly 20 includes vertical post frame members 28 and 30 which are interconnected by horizontal guide rail frame member 34 as more clearly seen in FIGURES 2 and 3. Also, similar vertical post members are disposed parallel to the post members 28 and 30 and are interconnected by a parallel horizontal guide rail frame member 36 as seen in FIGURE 2. The vertical post members 28 on the left side of the machine as viewed in FIGURE 3 are therefore interconnected at the bottom thereof by a bottom frame member 38 while the post members 30 are interconnected by the frame member 40 at the bottom thereof. The base portion of the frame assembly 20 is further made up of framing members 42 which interconnect the bottom frame members 42 and 44 as seen in FIGURES 2 and 3. The refuse collecting and conveying mechanisms 16 are therefore mounted between the frame members 42 and 44 and extend therebeyond as seen in FIGURES 1 and 2. It will also be observed in FIGURE 3 that the guide rail frame members 34 and 36 are interconnected by horizontal frame portions 46 and 48. Accordingly, the base frame members 42 and 44 support the table hoist mechanism 18 by means of a cross member 50 while a top cross frame member 52 connected between the horizontal guide rail frame members 34 and 36 rotatably supports the platen turning mechanism 22.

As was hereinbefore indicated, each of the band saw assemblies 14 is positioned on the frame assembly 20 by means of a subframe assembly 26. The band saw assembly 14 is also slidably mounted by the subframe assembly 26 for vertical movement by means of power mechanism as will be explained hereafter. The subframe assemblies 26 therefore include a pair of rectangular frame members 54 and 56 which are interconnected by a cross member 60. A plurality of track elements 62 are therefore secured to the inner walls of the rectangular frame members 54 and 56 for cooperation with the track rail projections 64 mounted on the rail frame members 34 and 36 so as to guidingly engage the track elements 62 for slidable support of the subframe assemblies 26 on the frame assembly 20. Also interconnected between the rectangular track members 54 and 56 is a guide frame 66 which includes a pair of parallel vertical rail members 68 and 70 interconnected by a top rail member 72 as more clearly seen in FIGURE 2. Accordingly, the guide frame 66 slidably supports the slide assembly 74. The slide assembly includes a pair of parallel track members 76 and 78 which are interconnected by a top member 80 for maintaining the track members 76 and 78 in spaced relation to each other. The bottom of the track members 76 and 78 are therefore connected in any siutable manner to the casing 82 of the band saw assembly 14. Also connected to the top connecting member 80 of the slide assembly 74 are a pair of hanger members 84 and 86 the bottom ends of which are connected to the outer side of the casing 82 of the band saw assembly 14 so as to thereby rigidly suspend the casing 82 of the assembly 14 from the slide assembly 74. Accordingly, the band saw assembly 14 may be slidably mounted by the slide frame 66 of the subframe assemblies 26.

It will therefore be apparent that the band saw assemblies 14 may be moved downwardly or upwardly by power mechanism which includes a hydraulic cylinder 88 anchored to the top member 72 of the guide frame 66, said cylinder 88 having slidably disposed therein a piston connected by a piston rod 90 to the top of the casing 82 of the band saw assembly 14. Accordingly, the cylinder member 88 is connected to a valve controlled pressure source for moving the saw assembly 14 downwardly when the band saw is rotating to cut the panels 12.

It will also be appreciated that the subframe assemblies 26 and the saw assemblies 14 slidably mounted thereon and vertically moved by the power cylinder 88 must be adjustably positioned along the guide rail frame members 34 and 36 of the frame assembly 20 in order to vary the size of the panels being cut. The position adjusting mechanism is therefore provided for such purpose and includes a pair of oppositely threaded screw members 92 and 94 which are rotatably mounted between the frame members 34 and 36 and are threadedly engaged by oppositely directed threads with the connecting members 60 of the subframe assemblies 26. The screw members 92 and 94 threadedly engage the cross members 60 by means of adjustment mechanisms 96 by means of which the subframe assemblies 26 may be accurately aligned parallel to each other in perpendicular relationship to the guide frame members 34 and 36 so that the band saw assemblies 14 may be properly aligned for accurate and square cutting of the panel boards. It will therefore be observed that the screw members 92 and 94 must be rotated in the same direction for simultaneous and equal movement of the portions of the subframe assemblies 26 with which they are drivingly engaged. Accordingly, bevel gears 98 are connected to each end of the screw members 92 and 94 and mesh with bevel gears 100 adjacent the outer ends of drive shafts 102 rotatably mounted by the frame and disposed along an axis perpendicular to the screw members 92 and 94. A pair of adjusting control motors 104 and 106 are therefore provided and mounted on the frame members 46 and 48 as more clearly seen in FIGURE 1, said motors being drivingly engaged by bevel gearing to the drive shafts 102 to thereby rotate the screw members 92 and 94 in the same direction. The motors 104 and 106 are therefore of the reversible type so that they may be controlled for rotating the screw members in both directions to thereby move the subframe assemblies 26 toward or away from each other. The reversible motors 104 and 106 are also provided with brake mechanisms 108 and 110 which are automatically engaged upon deenergization of the control motors 104 and 106 to thereby hold the bevel gearing and screw members in adjusted position.

It will be observed that the subframes 26 are moved toward or away from each other with respect to the centrally disposed turning platen mechanism 22. The mechanism 22 as more clearly seen in FIGURES 1 and 2 includes the platen member 112 which engages the top plan of the stack of panels 12 when elevated thereto by means of the hoist mechanism 18. The platen member 112 is therefore rotatably mounted by the cross frame 52 by spaced bearings 114 and 116 (FIGURE 3) through which the shaft 118 extends, said shaft being connected to the platen member 112 for rotation thereof when required. Accordingly, the shaft member 118 has connected thereto a brake disk 120 (FIGURE 1) which has notches disposed therein 90° apart for engagement by a pawl member 122 which is hydraulically actuated by a fluid power mechanism 124 to thereby positively hold the platen member 112 stationary at 90° positions thereof. Accordingly, when the power operated brake mechanism 122—124 is released from the brake disk 120 the platen member 112 may be rotated 90° whereupon the brake pawl 122 will be reengaged. The platen member is therefore rotated the correct angular distance by means of a gear member 126 connected to the top of the shaft 118 which gear is in mesh with a gear 128 driven by a motor 130. Although a motor gear drive is illustrated for purposes of rotating the platen member 112 it will be appreciated that other suitable and equivalent power operated mechanism may be utilized for such purposes. Accordingly, the platen member may alternatively be rotated by a fluid power operated pawl member engaging the brake disk 120, for example, operation of which will be correlated to the power operated brake pawl 122 which cooperates with the presently illustrated notches on the braking disk 120 for locking the platen in its adjusted positions. Accordingly, the stack of panel boards 12 may be rotated sequentially 90° in order to present the uncut sides of the board to the band saw assemblies 14 for trimming thereof to square the boards thereby.

As will be apparent, the chips and shavings are well as heavy sawdust will fall from beneath the band saw assemblies 14 as they cut through the panel boards 12. The accumulation of refuse in automatic machines of this type is a serious problem in view of the fact that a large number of boards are being cut which therefore produce a rapid pile up of refuse which must be removed in order to enable the machine to operate continuously. Therefore, the refuse collecting and conveying mechanisms 16 are provided for such purpose. The refuse collecting and conveying mechanisms 16 are therefore disposed on either side of the hoist mechanism below the supporting table 132 thereof in its lowermost position. Each of the mechanisms 16 therefore includes a supporting frame 134 by means of which belt supporting wheels 136 and 138 are rotatably supported at the outer ends of the mechanism 16 which extend beyond the frame assembly 20 as seen in FIGURES 1 and 2. The belt wheels 136 and 138 therefore have trained thereover a conveyor belt 140 on which the refuse is deposited and moved toward one end for disposal thereof. Accordingly, the frame 134 as seen in FIGURE 3 has connected thereto on one side thereof an inwardly angled collecting member 142 for channeling the refuse collected thereon onto the moving belt 140. The other side of the frame 134 has hingedly connected thereto an adjustably positioned deflecting member 144, the position of which is varied by means of a hydraulically operated actuator 146 as indicated by the arrows in FIGURE 3. Accordingly, the collecting member 144 may be controlled to variably channel the refuse onto the belt 140 as the hydraulically operated hoist mechanism 18 elevates or lowers the hoist table 132. In FIGURES 1 and 2 therefore it will be observed that the belts 140 are simultaneously driven in one direction by means of a drive shaft 146 interconnected to the belt wheels 138 and drivingly connected by means of a belt 148 to a continuously operating motor 150 provided for such purpose.

It will therefore be appreciated that the table hoist mechanism 18 is hydraulically operated and includes the power cylinder member 152 mounted on the base portion of the frame assembly 20 which power cylinder 152 hydraulically actuates the piston 154 which supports the table 132. Inasmuch as the panel board stack 12 carried on the table 132 is elevated into engagement with the platen member 112 and rotated thereby after parallel sides of the stack 12 have been cut, the table 132 will necessarily be rotatably supported by the hoist mechanism 18. The table 132 may therefore be rotatably supported by the piston member 154. In connection with the operation of the hoist mechanism 18, it will be appreciated that when tht hoist mechanism has elevated the stack 12 sufficient to impose a predetermined pressure on the top platen member 112, the platen member will provide a signal, for example, through a pressure responsive valve control 113 (diagrammatically illustrated in FIGURE 11) to the hydraulic power cylinders 88 which are connected to the saw assemblies 14 for movement thereof to thereby position the saw assemblies downwardly into the proper start position for the particular stack. Accordingly, the panel hold-down mechanisms 24 are provided for such purpose. The mechanisms 24 are therefore connected to the inner sides of the subframe assemblies 26 as more clearly seen in FIGURES 1 and 3 which mechanisms 24 respond to the predetermined pressure applied to the platen member 112 to thereby actuate the piston rams 156 thereof into engagement with the top panel of the stack 12. When the pressure on the mechanisms 24 reach the proper value a control switch 115 may also be operated thereby to initiate operation of the band saw assemblies 14 and also energize the power cylinders 88 to begin downward movement of the band saw assemblies. Also, simultaneous with the starting of the band saw assemblies 14 the operation of the hoist mechanism 18 will be terminated through any suitable device 117 so as to hold the stack 12 in its elevated position. When the saw band assemblies reach the bottom position at the level of the hoist table 132 the saw band assemblies will cease operating by means of any suitable limit switch device 129 and the power operated cylinders 88 will return them to their start position. It will of course be appreciated that any suitable control system, the specific details of which form no part of this invention, may be utilized by those skilled in the art to perform the aforementioned function which the saw machine is uniquely capable of carrying out.

Referring therefore to FIGURES 4, 5 and 6 it will be observed that each of the saw band assemblies 14 is enclosed within the elongated casing 82 which has enlarged ends for rotatably supporting a drive band wheel 158 and a band wheel 160 at its opposite end as more clearly seen in FIGURE 4. An electric motor 162 is therefore mounted at one end of the casing 82 and is connected to the drive band wheel 158 for rotation thereof. The band wheel 160 is connected to a fan blower 164 disposed within a housing 166 mounted on top of the opposite end of the casing 82. A band saw blade 168 is therefore trained around the band wheels 158 and 160 for movement thereof upon energization of the motor 162. When the motor is rotated therefore not only will the saw band 168 be moved for cutting the panel boards but the fan blower 164 will also be rotated to thereby provide suction within duct 170 for the purpose of drawing the dust from within the casing 82. Accordingly, the duct 170 interconnects the blower housing 166 with the opposite end of the casing adjacent the motor 162 for expelling the dust out through duct 172 from which duct 172 the sawdust may be collected in any suitable manner. It will also be observed that the motor end of the casing 82 includes a guard 174 for protection of the driving end of the saw blade.

It will be observed in FIGURES 4 and 5 that the band blade 168 is guided at one side of the casing 82, at which side the band blade 168 is in cutting engagement with the panel board stack 12. Accordingly, a guide member 174 is connected to the casing 82 and extends downwardly therefrom between the motor and the lower ends. A plurality of rollers 176 are therefore rotatably mounted on the guide member 174 for bearing contact with the top edge of the saw blade 168 in order to sustain the pressure imposed on the saw blade by the panel boards through which the moving blade is urged by the power rams 90 which the saw assemblies 14 are connected to for power movement thereby.

In FIGURES 7, 8, 9 and 10 a modified form of blade guide arrangement is illustrated. In the latter figures the guide member is removably mounted on the casing 178, said guide member being indicated by reference numeral 180. The guide member 180 is disposed above the top edge of the saw blade 168 while rollers 182 are provided beyond the ends thereof for roller bearing contact with the top edge of the saw blade 168 as more clearly seen in FIGURE 9. The rollers 182 are accordingly adjustably mounted on the casing 178 by means of mounting angle members 184. However, the saw blade 168 between the ends of the guide member 180 is backed by a shear member 186 adjustably mounted to the casing 178 and the guide member 180 as more clearly seen in FIGURE 8. The member 188 is also provided and connected to the casing 178 in order to accurately and properly position the shear member 186 between it and the guide member 180. It will therefore be appreciated that the shear member 186 not only will provide backing for the saw blade 168 but will shear the shavings that may accumulate behind the saw blade 168 as the saw assemblies 14 are moved through the panel boards. The shear member 186 will therefore sever the shavings and deflect them away and thereby maintain the band saw assemblies continuously operative by avoiding an accumulation of shavings which may eventually interrupt operation of the band saw assemblies or reduce the efficiency thereof.

From the foregoing description operation and utility of the automatic saw machine will be apparent. However, the operation thereof will be summarized. It will therefore be recalled that the stack of panel boards 12 may be automatically loaded on to the table 132 of the hydraulic hoist mechanism 18 in its lowermost position. The stack will thereupon be elevated by the hoist mechanism 18 to a position in which the top panel board will engage the platen member 112. The subframe assemblies 26 which carry the vertically movable band saw assemblies 14 will have been adjusted to the desired position by means of the rotatable screw members 92 and 94 rotatably mountd on the frame assembly 20 which are controlled by the adjustment motors 104 and 106 so that the band saw assemblies 14 may cut the requisite size panel boards. Accordingly, when the hoisting mechanism 18 has risen to such an extent as to apply a predetermined pressure on the platen member 112 the panel hold-down mechanisms 24 which are connected to the subframe assemblies 26 which are now in proper position on the frame assembly 20 will be energized to engage the top panel and the hoist mechanism movement is terminated. An increasing pressure on the top panel will be applied by the hold-down mechanism 24 so that when a predetermined pressure is realized suitable control mechanism will energize the saw band motors 162 to thereby move the saw blades 168 of the saw band assemblies 14. Also, the hydraulic cylinders 88 will be energized to begin actuation of the pistons 90 to thereby move the saw assemblies 14 downwardly through the panel board stack 12 for cutting thereof. As the saw blades 168 move through the panel boards the accumulated shavings thereof will be sheared by the shear blade 186, if used, which will also deflect the shavings from the blade to maintain the saw blades and saw assemblies 14 in continuous and efficient operation. Accordingly, the shavings, wood chips and sawdust will fall downwardly and will be channeled by the members 144 and 142 onto a conveyor belt 140 of the collecting and movable mechanisms 16 to thereby remove the accumulation of refuse from the saw machine. At the same time, the operating band saw assemblies 14 will also operate the suction blowtrs 164 mounted thereon to thereby remove the sawdust accumulating within the casing of the assemblies 14, and deliver the sawdust through the delivery duct 172 for removal with the refuse on the conveyor belt 140 of the mechanisms 16. When the band saw assemblies have reached the level of the table 132 they may actuate the control switch 120 whereby the band sow motors 162 will cease operation and the hydraulic cylinders 88 will reverse to thereby return the band saw assemblies 14 to their start position. Referring therefore to the control system of FIGURE 11, an exemplary arrangement is shown wherein the band saw assemblies 14 upon reaching their start positions another control 121 may be operated to energize the platen turning motor 130 and simultaneously withdraw the brake pawl 122 from the notches on the brake disk 120 connected to the platen member 112. Accordingly, the platen member and the stack 12 in engagement therewith will be rotated 90° whereupon the turning motor 130 will cease operation and the brake pawl 122 will be reengaged by the brake mechanism 124. The band saw assemblies 14 will then be reenergized and the power operated cylinders 88 pressurized to again perform a cutting cycle as herein before described. When the band saw assemblies 14 once again return to the start position, the panel boards stack 12 will have been completely trimmed and squared whereupon device 120 will be effective on the hoist mechanism 18 to lower the stack 12 so that it may be automatically moved from the saw machine. It should of course be appreciated that manual controls may also be used in order to perform the specified functions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new in as follows:

1. An automatic saw machine comprising, frame means, load supporting hoist means slidably mounted in said frame means for raising a stack of panels to be cut, top pressure means rotatably mounted in said frame means above said hoist means for engagement by a top panel of said stack of panels for providing a pressure responsive signal to terminate raising operation of said hoist means, adjustably positioned saw means movably mounted in said frame means for cutting said panels to a predetermined size, power means mounted on said frame means above said saw means for energizing the saw means and moving the saw means downwardly through the stack of panels after termination of the raising operation by the hoist means and deenergizing and returning the saw means to its start position after predetermined downward movement of the saw means, turning means operatively connected to said top pressure means for turning the stack of panels in engagement with the pressure means 90°, after return of said saw means to start position.

2. The machine as defined in claim 1, wherein said pressure means includes a rotatable top platen for pressure contact with a top panel, and panel edge holddown means which provides the pressure signal.

3. The machine as defined in claim 2, wherein said turning means comprises motor means operatively connected to said platen and brake means for holding said platen stationary during sawing operation.

4. The machine as defined in claim 3, wherein said saw means comprises a pair of band saw assemblies slidably mounted on said frame means on either side of the top pressure means and position adjusting screw means rotatably mounted on said frame means and drivingly connected to said band saw assemblies for moving them toward or away from each other.

5. The machine as defined in claim 4, including adjustable refuse collecting and disposal means operatively positioned on said frame means on either side of said hoist means for receiving panel trimmings cut by the saw means and conveying it off to a delivery end of the frame means.

6. The machine as defined in claim 5, wherein said power means comprises a motor operatively connected to and mounted on one end of each band saw assembly and power operated rams connected to the assemblies and slidably mounted by the frame means for moving the assemblies downwardly and upwardly.

7. The machine as defined in claim 6, wherein each band saw assembly includes an elongated casing means slidably mounted on vertical track means and connected to said power operated rams, said vertical track means being drivingly connected to said adjusting screw means for adjustably positioning the track means, power means and saw means on the frame means.

8. The machine as defined in claim 7, wherein each band saw assembly includes an endless band blade extending beyond the panels and driven at said one end by the motor mounted on top of the casing means, the other end of the band blade being drivingly engaged with an idler wheel to which blower means is conencted for exhausting saw dust from the casing means.

9. The machine as defined in claim 1, wherein said saw means comprises a pair of band saw assemblies slidably mounted on said frame means on either side of the top pressure means and position adjusting screw means rotatably mounted on said frame means and drivingly connected to said band saw assemblies for moving them toward or away from each other.

10. The machine as defined in claim 9, wherein said power means comprises a motor operatively connected to and mounted on one end of each band saw assembly and power operated rams connected to the assemblies and slidably mounted by the frame means for moving the assemblies downwardly and upwardly.

11. The machine as defined in claim 10, wherein each band saw assembly includes an elongated casing means slidably mounted on vertical track means and connected to said power operated rams, said vertical track means being drivingly connected to said adjusting screw means for adjustably positioning the track means, power means and saw means on the frame means.

12. The machine as defined in claim 1, wherein the saw means includes an endless band blade driven at one end by a motor mounted on top of the saw means, the other end of the band blade being drivingly engaged with an idler wheel to which a blower means is connected for exhausting sawdust from the saw means.

13. The machine as defined in claim 1, including adjustable refuse collecting and disposal means operatively positioned on said frame means on either side of said hoist means for receiving panel trimmings cut by the saw means and conveying it off to a delivery end of the frame means.

References Cited in the file of this patent

UNITED STATES PATENTS

| | | |
|---|---|---|
| 691,267 | Hill | Jan. 14, 1902 |
| 1,088,092 | Reichlinger | Feb. 24, 1914 |
| 1,789,092 | Tannewitz | Jan. 20, 1931 |
| 1,853,554 | Dennis | Apr. 12, 1932 |
| 2,596,481 | Hincks | May 13, 1952 |
| 2,601,576 | Wells et al. | June 24, 1952 |
| 2,606,578 | Irwin et al. | Aug. 12, 1952 |
| 2,918,950 | Letarte | Dec. 29, 1959 |

FOREIGN PATENTS

| | | |
|---|---|---|
| 281,193 | Germany | Dec. 17, 1914 |
| 710,592 | France | June 9, 1931 |